United States Patent [19]
Peteretti

[11] 4,126,351
[45] Nov. 21, 1978

[54] COVER FOR AN OPEN BODY

[75] Inventor: Raymond H. Peteretti, Whitestone, N.Y.

[73] Assignee: Toneray Covers, Inc., Whitestone, N.Y.

[21] Appl. No.: 696,423

[22] Filed: Jun. 15, 1976

[51] Int. Cl.² ............................................. B60P 7/02
[52] U.S. Cl. ........................................ 296/100; 52/3; 296/98
[58] Field of Search ...................... 52/136, 3, 4; 2/93, 2/215, 218; 150/52 R

[56] References Cited

U.S. PATENT DOCUMENTS

| | | | |
|---|---|---|---|
| 1,895,237 | 1/1933 | Stan | 2/93 |
| 2,478,110 | 8/1949 | Katz | 2/93 |
| 3,549,197 | 12/1970 | Sibley | 296/100 |

*Primary Examiner*—Robert R. Song
*Attorney, Agent, or Firm*—Holland, Armstrong, Wilkie & Previto

[57] ABSTRACT

A cover for an open body which has an expandable pleat therein.

2 Claims, 3 Drawing Figures

U.S. Patent  Nov. 21, 1978  4,126,351
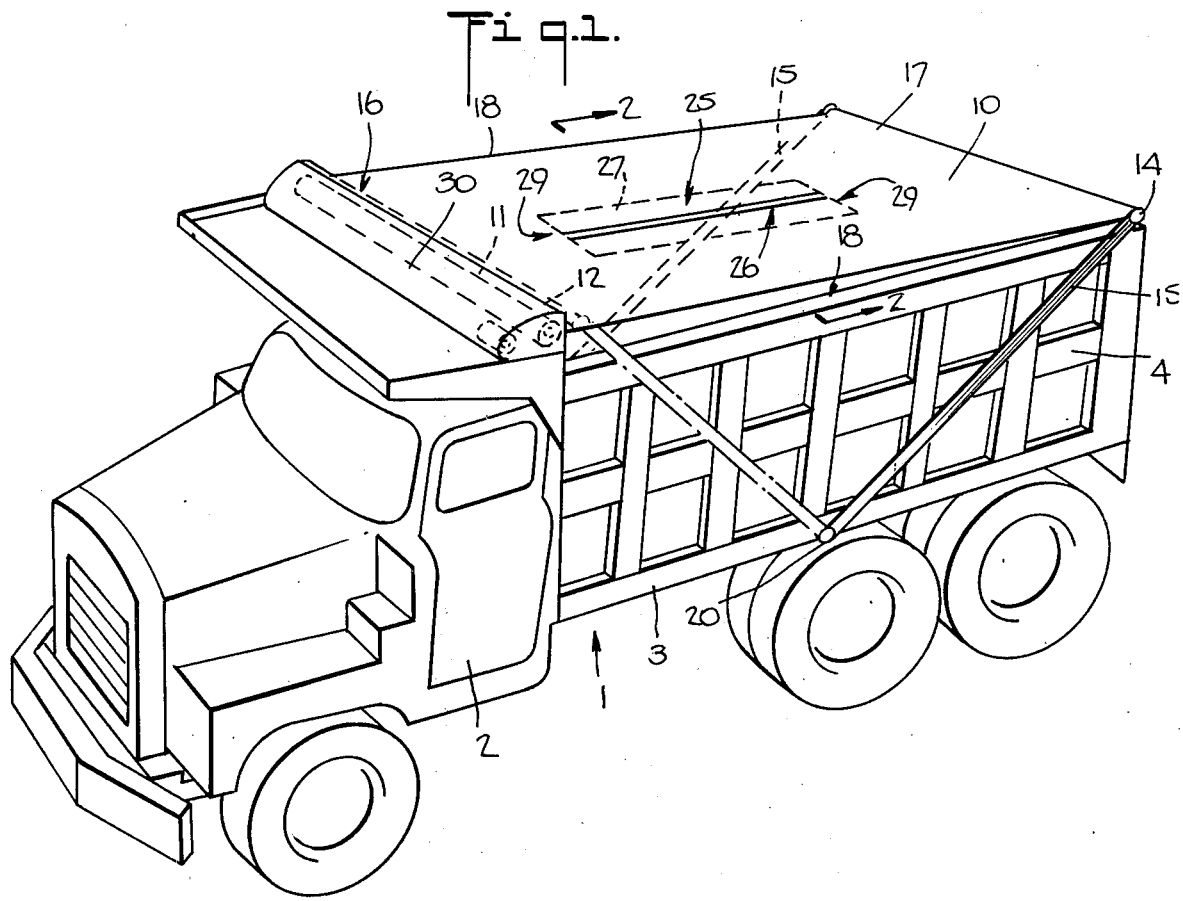
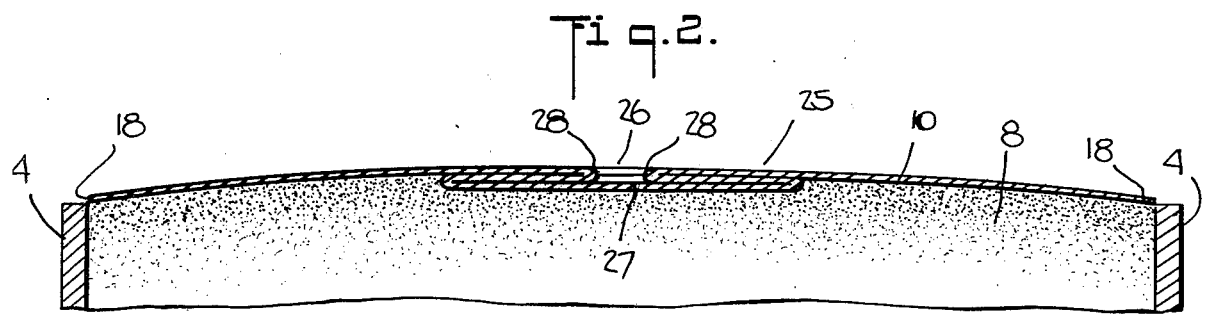
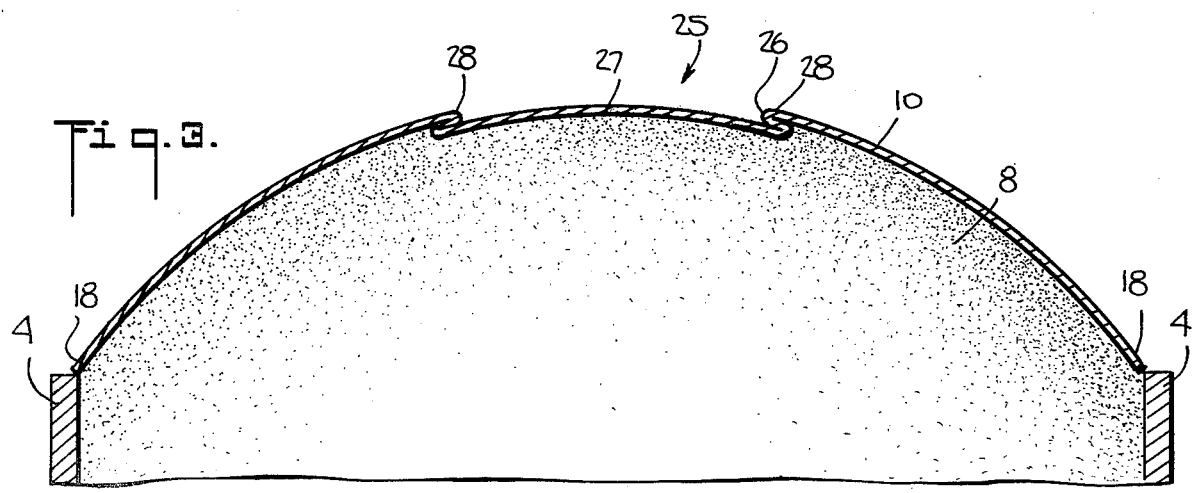

COVER FOR AN OPEN BODY

DESCRIPTION

The present invention comprises a cover for an open body and particularly a cover for an open truck, such as a dump truck, in which the canvas cover is movable from a load-covering position to a load-uncovering position.

It is customary for dump trucks to have the dump bodies open at the top so that they can be easily filled with a load. When the load is to be dumped, a rear wall of the open truck is adapted to swing open and the open body is tilted upwardly to dump the load.

When transporting the load from one place to the other, it is desirable for the load to be covered in order to prevent the debris from being ejected from the open body and to prevent contamination of the air or the streets.

It has been found that if the load extends far above the side walls of the truck, the ordinary cover is not adequate to cover the load entirely so that some of the debris may spill out from beneath the sides or the back of the cover.

The present invention is directed to an improved cover wherein means are provided for permitting the canvas cover to expand to cover an oversized load.

Another object of the present invention is the provision of an improved canvas cover which automatically expands to cover a high load and also adequately contracts to cover a normal load.

Another object of the present invention is the provision of an improved canvas cover wherein the canvas cover has a built in automatically extending means.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings forming a part of the specification, wherein:

FIG. 1 is a perspective view showing the cover of the present invention in use.

FIG. 2 is a sectional view taken along line 2—2 of FIG. 1.

FIG. 3 is a sectional view showing the cover in its expanded position.

Referring more particularly to the drawings, a dump truck 1 is shown which may be used in connection with the present invention. The truck 1 comprises a front cab 2 and a rear tiltable dump body 3 having a bottom front and rear walls (not shown) and a pair of side walls 4. The rear wall is preferably adapted to pivotally open when the dump body 3 is tilted upwardly to dump a load 8 therefrom.

A cover 10, which may be made of a flexible canvas material, is rolled around a take-up roller 11 mounted above the cab 1 and has its inner end 12 anchored to the take-up roller 11 and its outer end 13 mounted on a cross bar 14. The cross bar 14 extends across and above the tops of the walls 4 and is journalled at each end to a pair of arms 15, which extend downwardly along the outside of side walls 4. The arms 15 are joined together by a pivot rod 20 which is beneath the bottom wall and is journalled on mounts depending from the bottom wall.

The opening and closing of the canvas 10 is controlled by a motor 30. When the cover 10 is in the open position the canvas is rolled around the take-up roller 11 and held in place by a sprocket and chain assembly (not shown). When it is desired to unroll the canvas to a load covering position, the motor 30 is activated from a position inside the cab 2. The motor 30 rotates in a one direction (clockwise in FIG. 1) which causes roller 11 to rotate in a clockwise direction. As the canvas 10 is unrolled, springs (not shown) move the arms 15 back toward the rear to unroll the canvas and cover the load. At the rear, the arms 15 are held in place by locking means, which prevent the springs from exerting any bias on the arms 15 when the arms are in the most rearward load-covering position. The locking means also prevents any inadvertant movement of the arms and any inadvertant movement of the arms and any inadvertant opening of the cover 10.

When the load 8 is to be uncovered the motor 30 is again activated but this time it rotates in the opposite direction (counter-clockwise in FIG. 1) so that take-up roller 11 rotates counter-clockwise to roll up the canvas 10 on the roller 11 and pull the arms 15 back against action of springs to the forward part of the dump body to thereby uncover the load 8.

The full details of the operating mechanism preferably used in this application is described in copending application Ser. No. 567,498 filed Apr. 14, 1975.

The particular canvas cover 10 of the present invention is preferably rectangular with the usual front and rear ends 16 and 17 and side ends 18. The cover comprises a pleat 25 formed longitudinally of the cover 10. The pleat 25 comprises a longitudinal, centrally located slit 26 in the cover and additional material 27 depending from the cover and underlying the slit 26. The additional material 27 is attached to the cover adjacent the slit at side edges 28 of the slit 26 and transversely adjacent with end edges 29 of the slit 26.

With this structure, if there is a large load, the pleat 25 will open to widen the material 27, as shown in FIG. 3, to permit the cover 10 to expand automatically. If the load is a normal one the pleat does not open and the material remains in its normal, underlying flat relationship with the cover 10, as shown in FIG. 2. This material 27 may be one piece with cover 10 or it may be made with a separate piece sewn thereto.

It will thus be seen that the present invention provides an improved cover wherein means are provided for permitting the canvas cover to expand to cover an oversized load and which automatically expands to cover a high load and also adequately contracts to cover a normal load.

As many and varied modifications of the subject matter of this invention will become apparent to those skilled in the art from the detailed description given hereinabove, it will be understood that the present invention is limited only as provided in the claims appended hereto.

What is claimed is:

1. A cover for an open body of a vehicle for covering a load in said open body comprising a flexible elongated sheet having end edges and side edges, an expandable pleat on said sheet adapted to permit the cover to expand, said pleat comprising a longitudinal slit and underlying material underlying said slit, said underlying material mounted on the sheet adjacent each side edge of the slit and adjacent the end edges of the slit, said underlying material and said sheet being integral with each other, said slit being located substantially centrally between the side edges of the sheet and being substantially parallel thereto and being substantially centrally located between the end edges of the sheet, the side edges of the slit being in adjacency to each other when the pleat is inactive and being bowed apart from each other when the pleat is active.

2. An open body of a vehicle having a cover movable from a load-covering position to a load-uncovering position, said cover comprising a flexible elongated sheet having end edges and side edges, an expandable pleat on said sheet adapted to permit the sheet to expand, said pleat comprising a longitudinal slit and underlying material underlying said slit, said underlying material mounted on the sheet adjacent each side edge of the slit and adjacent the end edges of the slit, said underlying material and said sheet being integral with each other, said slit being located substantially centrally between the side edges of the sheet and being substantially parallel thereto and being substantially centrally located between the end edges of the sheet, the side edges of the slit being in adjacency to each other when the pleat is inactive and being bowed apart from each other when the pleat is active.

* * * * *